(12) United States Patent
Wetzstein et al.

(10) Patent No.: US 10,192,292 B2
(45) Date of Patent: Jan. 29, 2019

(54) ACCOMMODATION-INVARIANT COMPUTATIONAL NEAR-EYE DISPLAYS

(71) Applicant: The Board of Trustees of the Leland Stanford Junior University, Stanford, CA (US)

(72) Inventors: Gordon Wetzstein, Palo Alto, CA (US); Robert Konrad, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 15/382,432

(22) Filed: Dec. 16, 2016

(65) Prior Publication Data

US 2017/0236255 A1 Aug. 17, 2017

Related U.S. Application Data

(60) Provisional application No. 62/295,987, filed on Feb. 16, 2016.

(51) Int. Cl.
*G06T 5/10* (2006.01)
*G06T 5/00* (2006.01)
(Continued)

(52) U.S. Cl.
CPC .......... *G06T 5/003* (2013.01); *G02B 27/0075* (2013.01); *G02B 27/017* (2013.01);
(Continued)

(58) Field of Classification Search
CPC ....... G06T 11/001; G06T 11/60; G06T 5/001; G06T 5/20; G06T 11/00; G06T 5/10;
(Continued)

(56) References Cited

U.S. PATENT DOCUMENTS

2008/0175508 A1\* 7/2008 Bando ..................... G06T 5/003
382/255
2017/0269358 A9\* 9/2017 Luebke .................. G02B 27/01

OTHER PUBLICATIONS

Akeley et al., "A Stereo Display Prototype with Multiple Focal Distances", ACM Trans. Graph. (SIGGRAPH), 2004, vol. 23, No. 3, pp. 804-813.
(Continued)

*Primary Examiner* — Ke Xiao
*Assistant Examiner* — Andrew Shin
(74) *Attorney, Agent, or Firm* — KPPB LLP

(57) ABSTRACT

Near-eye display systems in accordance with embodiments of the invention enable accommodation-invariant display control. One embodiment includes a near-eye display; a processor; a memory containing a target image and an accommodation-invariant display application; where the processor is configured by the accommodation-invariant display application to calculate an impulse response of the near-eye display; calculate a compensation image by generating a deconvolved color channel of the target image using a ratio of the target image and the impulse response, where the compensation image is a representation of the target image that remains in focus at a plurality of distances from the near-eye display; and display the compensation image on the near-eye display.

16 Claims, 13 Drawing Sheets

(51) Int. Cl.
  G06T 11/00 (2006.01)
  G02B 27/01 (2006.01)
  G02B 27/00 (2006.01)
(52) U.S. Cl.
  CPC ...... *G06T 5/10* (2013.01); *G06T 2207/20024* (2013.01); *G06T 2207/20056* (2013.01); *G06T 2207/20201* (2013.01)
(58) Field of Classification Search
  CPC .. G06T 5/00; G06T 5/50; G06T 5/003; G06E 3/001; G02B 27/01; G02B 27/017; G02B 27/0189; G02B 27/0012; G02B 27/0025; G02B 27/0075; H04N 19/60
  USPC ......... 345/581, 619; 382/254, 255, 279, 280
  See application file for complete search history.

(56) References Cited

OTHER PUBLICATIONS

Askit et al., "Super Stereoscopy 3D Glasses for More Realistic 3D Vision", In 3DTV-Conference: The True Vision, Capture, Transmission and Display of 3D Video, 2014, pp. 1-3.
Campbell et al., "Dynamics of Accommodation Responses of the Human Eye", J. Physiol., 1960, vol. 151, pp. 285-295.
Cossairt et al., "Diffusion coded photography for extended depth of field", ACM Trans. Graph., (SIGGRAPH), 2010, vol. 29, No. 4, pp. 31:1-31:10.
Cossairt et al., "Spectral Focal Sweep: Extended Depth of Field from Chromatic Aberrations", In Proc. ICCP, 2010, 8 pgs.
Cutting et al., "Perceiving layout and knowing distances: The integration, relative potency, and contextual use of different information about depth", Handbook of perception and cognition, Perception of space and motion, 1995, pp. 69-117.
De Groot et al., "Pupil size as determined by adapting luminance", Journal of the Optical Society of America, Jul. 1952, vol. 42, No. 7, pp. 492-495.
Dolgoff, "Real-depth imaging: a new 3D imaging technology with inexpensive direct-view (no. glasses) video and other applications", Proc SPIE 3012, May 15, 1997, 282-288.
Dowski et al., "Extended depth of file through wave-front coding", Applied Optics, Apr. 10, 1995, vol. 34, No. 11, pp. 1859-1866.
Fincham, "The Accommodation Reflex and Its Stimulus", British Journal of Ophthalmology, vol. 35, 1951, pp. 351-393.
Fincham et al., "The Reciprocal Actions of Accommodation and Convergence", J. Physiol., 1957, vol. 137, pp. 488-508.
Grosse et al., "Coded Aperture Projection", ACM Transactions on Graphics, vol. 3, Jun. 2010, pp. 22:1-22:12.
Hausler, "A method to increase the depth of focus by two step image processing", Optics Communications, Sep. 1972, vol. 6, No. 1, pp. 38-42.
Held et al., "Blur and Disparity Are Complementary Cues to Depth", Current Biology, Mar. 6, 2012, vol. 22, pp. 426-431.
Heron et al., "Age Changes in the Interactions Between the Accommodation and Vergence Systems", Optometry and Vision Science, Oct. 2001, vol. 78, No. 10, pp. 754-762.
Hoffman et al., "Focus information is sued to interpret binocular images", Journal of Vision, 2010, vol. 10, No. 5:13, pp. 1-17.
Hoffman et al., "Vergence-accommodation conflicts hinder visual performance and cause visual fatigue", Journal of Vision, 2008, vol. 8, No. 3:33, pp. 1-30.
Hu et al., "Design and Assessment of a Depth-Fused Multi-Focal-Plane Display Prototype", Journal of Display Technology, Apr. 2014, vol. 10, No. 4, pp. 308-316.
Hua et al., "A 3D integral imaging optical see-through head-mounted display", Optics Express, May 28, 2014, Jun. 2, 2014, vol. 22, No. 11, pp. 13484-13491.
Huang et al., "The light field stereoscope: Immersive computer graphics via factored near-eye light field display with focus cues", ACM Trans. Graph. (SIGGRAPH), 2015, 34, 4, 12 pgs.
Iwai et al., "Extended Depth-of-Field Projector by Fast Focal Sweep Projection", IEEE Transactions on Visualization and Computer Graphics, Apr. 2015, vol. 21, No. 4, pp. 462-470.
Konrad et al., "Accommodation-Invariant computational Near-Eye Displays", ACM Transactions on Graphics, Jul. 2017, vol. 46, No. 4, Article 88, pp. 1-12.
Kooi et al., "Visual comfort of binocular and 3D displays", Displays, 2004, vol. 25, pp. 99-108.
Lambooij et al., "Visual Discomfort and Visual Fatigue of Stereoscopic Displays: A Review", Journal of Imaging Science and Technology, 2009, vol. 53, No. 3, pp. 030201-1-030201-14.
Lanman et al., "Near-eye light field displays", ACM Trans. Graph. (SIGGRAPH Asia), 2013, vol. 32, No. 6, pp. 220:1-220:10.
Liu et al., "An optical see-through head mounted display with addressable focal planes", In Proc. ISMAR, 2008, pp. 33-42.
Llull et al., "Design and optimization of a near-eye multifocal display system for augmented reality", In OSA Imaging and Applied Optics, Jan. 2015, 3 pgs.
Love et al., "High-speed switchable lens enables the development of a volumetric stereoscopic display", Optics Express, Aug. 2009, vol. 17, No. 18, pp. 15716-15725.
Mauderer et al., "Depth Perception with Gaze-Contingent Depth of Field", in Proceeding of the SIGCHI Conference on Human Factors in Computing Systems, 2014, 10 pgs.
Miau et al., "Focal Sweep Videography with Deformable Optics", In Proc. ICCP, 2013, pp. 1-8.
Nagahara et al., "Flexible Depth of Field Photography", In Proc. ECCV, 2008, 14 pgs.
Narain et al., "Optimal Presentation of Imagery with Focus cues on Multi-Plane Displays", ACM Transactions on Graphics, Aug. 2015, vol. 34, No. 4, Article 59, 12 pgs.
Peli, "Optometric and perceptual issues with head-mounted displays", In Visual Instrumentation: Optical Design & Engineering Principles, 1999, 74 pgs.
Rolland et al., "Multifocal planes head-mounted displays", Applied Optics, Aug. 2000, vol. 39, No. 9, pp. 3209-3215.
Schor, "A Dynamic Model of Cross-Coupling Between Accommodation and Convergence: Simulations of Step and Frequency Responses", Optometry and Vision Science, 1992, vol. 69, pp. 258-269.
Schowengerdt et al., "True 3-D scammed voxel displays using single of multiple light sources", Journal of the SID, 2006, vol. 14, No. 2, pp. 135-143.
Shibata et al., "The zone of comfort: Predicting visual discomfort with stereo displays", Journal of Vision, 2011, vol. 11, No. 8:11, pp. 1-29.
Sugihara et al, "32.4: A lightweight 3-D hmd with accommodative compensation", SID Digest, 29, 1, May 1998, pp. 927-930.
Sweeney et al., "Quantifying interactions between accommodation and vergence in a binocularly normal population", Vision Research, 2014, vol. 105, pp. 121-129.
Toates, "Accommodation function of the human eye", Physiological Reviews, 1972, vol. 52, pp. 828-863.
Tsuetaki et al., "Clinical method for measuring adaptation of tonic accommodation and vergence accommodation", American Journal of Optometry and Physiological Optics, 1987, vol. 64, No. 6, pp. 437-449.
Von Waldkirch et al., "Multiple imaging technique for extending depth of focus in retinal displays", Optics Express, published Nov. 20, 2009, Dec. 13, 2004, vol. 12, No. 25, pp. 6350-6365.
Watt et al., "Focus cues affect perceived depth", Journal of Vision, 2005, vol. 8, pp. 834-862.
Zhai et al., "Extended depth of field through an axicon", Journal of Modern Optics, Jun. 2009, vol. 56, No. 11, pp. 1304-1308.

* cited by examiner

ACCOMMODATION-INVARIANT COMPUTATIONAL NEAR-EYE DISPLAYS

CROSS-REFERENCE TO RELATED APPLICATIONS

The present invention claims priority to U.S. Provisional Patent Application Ser. No. 62/295,987 entitled "Accommodation-invariant Computational Near-eye Displays" to Gordon Wetzstein et al., filed Feb. 16, 2016. The disclosure of U.S. Provisional Patent Application Ser. No. 62/295,987 is herein incorporated by reference in its entirety.

FIELD OF THE INVENTION

The present invention generally relates to near-eye displays and more specifically relates to accommodation invariant processes for near-eye displays.

BACKGROUND

Immersive and experiential computing systems are entering the consumer and industrial markets and have the potential to profoundly impact society. Applications of these systems range from entertainment, education, collaborative work, simulation and training to telesurgery, phobia treatment, and basic vision research.

Virtual reality and augmented reality systems can produce highly-immersive experiences, but they can also cause visual discomfort, eyestrain, and nausea. In every immersive experience, the primary interface between the user and the digital world is a near-eye display. Many characteristics of the near-eye displays can define the quality of a users experience, such as resolution, refresh rate, contrast, and field of view. Despite significant improvements in virtual reality and augmented reality systems, significant sources of visual discomfort can still be experienced during use of such devices.

One of the primary sources of discomfort is often the vergence-accommodation conflict (VAC). In the natural environment, the human visual system relies on a variety of cues to determine the 3D layout of scenes. The extent to which a near-eye display can recreate these cues can determine the quality and comfort of the user experience. Vergence and accommodation are two different oculomotor cues that the human visual system can use for estimating absolute and relative distance of objects. Vergence refers to the relative rotation angle of the two eyeballs; when objects are fixated on nearby, the eyeballs rotate inwards, whereas the opposite happens when objects are fixated on at some distance. The brain can interpret the relaxation or contraction of the extraocular muscles that physically rotate the eyeball as a cue for the absolute distance of the fixated object. The associated visual cue is known as binocular disparity the relative displacement between the images of a 3D scene point projected on two retinal images. Together, vergence and disparity make up stereopsis, which is generally considered a strong depth cue, especially for objects at intermediate distances (i.e. 1-10 m). Accommodation is an absolute monocular depth cue that refers to the state of the ciliary muscles, which focus the crystalline lens in each eye. As with vergence, the state of these muscles varies as a function of the distance to the point at which the eyes are focused. Accommodation combined with the associated visual cue, retinal blur or perceived depth of field (DOF), make up the focus cues, which are particularly useful for depth perception of objects nearby. In normal viewing conditions, the visual cues provide input signals that can be used to adjust the oculomotor responses i.e. disparity drives vergence and blur drives accommodation.

The brain is wired to interpret all of these visual and oculomotor stimuli in a consistent manner, because that is what a person with normal vision experiences in the physical world. In many current virtual reality (VR) and/or augmented reality (AR) near-eye displays, a stereoscopic image pair drives the vergence state of the human visual system to arbitrary distances, but the accommodation, or focus state of the eyes is optically driven towards a fixed distance (i.e. that of the virtual image of the microdisplay). Specifically, many conventional near-eye displays use magnifying optics to create a virtual image of a physical micro-display that is perceived at a fixed optical distance that cannot be changed in software. Hence, retinal blur drives the user's accommodation to the virtual image. The discrepancy between these depth cues hinder visual performance and create visual discomfort and fatigue, and compromised visual clarity. Observed symptoms can be similar to motion sickness.

SUMMARY OF THE INVENTION

Near-eye display systems in accordance with many embodiments of the invention enable accommodation-invariant display control. One embodiment includes a near-eye display; a processor; a memory containing a target image and an accommodation-invariant display application; where the processor is configured by the accommodation-invariant display application to calculate an impulse response of the near-eye display; calculate a compensation image by generating a deconvolved color channel of the target image using a ratio of the target image and the impulse response, where the compensation image is a representation of the target image that remains in focus at a plurality of distances from the near-eye display; and display the compensation image on the near-eye display.

In a further embodiment, the impulse response is an integrated point spread function.

In another embodiment, the integrated point spread function is evaluated by the processor by using the following expression:

$$\tilde{\rho}(r) = \int_0^T \rho(r, f(t)) dt$$

where $\tilde{\rho}(r)$ is the integrated point spread function, $\rho(r, f(t))$ is a Gaussian point spread function. T is a finite exposure time, and f(t) maps time to temporally-varying focal lengths.

In a still further embodiment, the integrated point spread function further comprises a variance which is evaluated by the processor using the following expression:

$$\tilde{\sigma}^2 = \frac{c^2}{4} \int_0^T b(f(t))^2 dt$$

where $\tilde{\sigma}$ is the variance, T is a finite exposure time, f(t) maps time to temporally-varying focal lengths, c is a constant, and b is a constant.

In still another embodiment, generating the deconvolved color channel of the target image further comprises generating each color channel of the target image individually.

In a yet further embodiment, generating the deconvolved color channel further comprises inverse filtering.

In yet another embodiment, inverse filtering is evaluated by the processor by using the following expression:

$$i_c(x, y) = \mathcal{F}^{-1}\left\{\frac{\mathcal{F}\{i(x, y)\}}{\mathcal{F}\{\tilde{p}(x, y)\}}\right\}$$

where $i_c$ is the compensation image, i is the target image, $\tilde{p}(x,y)$ is the integrated point spread function, and $\mathcal{F}\{\bullet\}$ is the discrete Fourier transform.

In a further embodiment again, the near-eye display is a head mounted display.

In another embodiment again, the near-eye display is a virtual reality display.

In a further additional embodiment, the near-eye display is an augmented reality display.

Another additional embodiment of the invention includes: calculating an impulse response of a near-eye display using a processor configured by an accommodation-invariant display application stored in a memory; calculating a compensation image by generating a deconvolved color channel of a target image using a ratio of the target image and the impulse response using the processor configured by the accommodation-invariant display application stored in the memory, where the compensation image is a representation of the target image that remains in focus at a plurality of distances from the near-eye display; and displaying the compensation image on the near-eye display.

DETAILED DESCRIPTION

Turning now to the drawings, systems and methods for accommodation-invariant near-eye displays in accordance with various embodiments of the invention are illustrated. Rather than producing correct focus cues, many embodiments of the invention include accommodation-invariant displays that are optically engineered to produce retinal blur cues that are invariant to the accommodation state of the eye. The accommodation system can then be driven by stereoscopic cues, and mismatched cues between stereoscopic cues and blur cues are mitigated.

Figure 4:
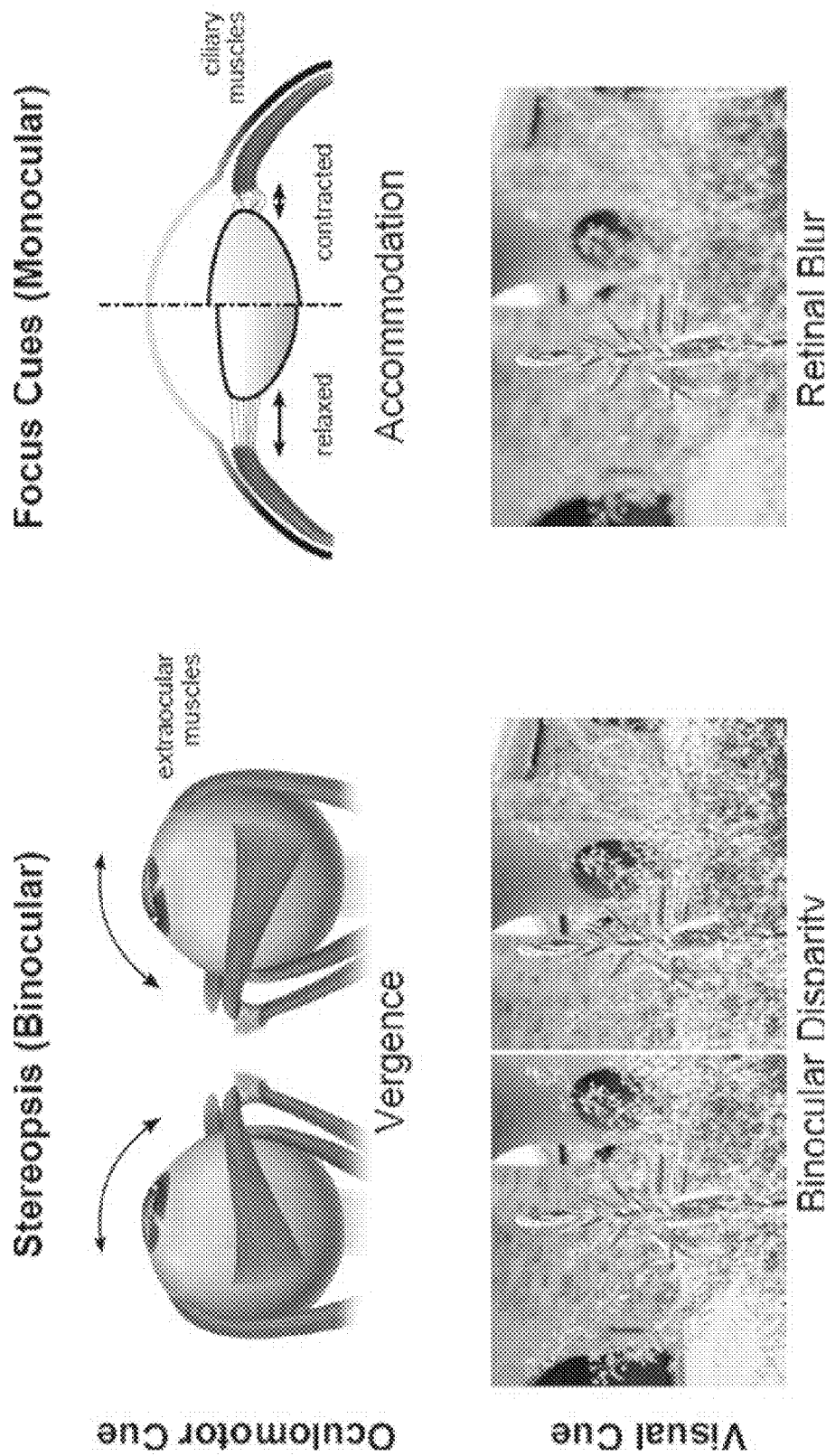
FIG. 4 is a diagram illustrating relevant depth cues in accordance with an embodiment of the invention.

In a number of embodiments, accommodation-invariant displays utilize point spread functions (PSF) that are invariant to accommodation depth, a technique known as extended depth of field (EDOF) in the computational imaging community. Accommodation-invariant near-eye displays in accordance with many embodiments of the invention optically create a constant retinal blur gradient. Under these conditions, the blur-driven accommodation of the viewer may be disabled and the viewer's visual system may revert to disparity-driven accommodation. In this situation, both vergence and accommodation produce consistent cues, thereby mitigating visual discomfort and improving visual clarity. FIG. 4 illustrates an overview of relevant depth cues in several embodiments of the invention. Vergence and accommodation are oculomotor cues whereas binocular disparity and retinal blur are visual cues. In normal viewing conditions, disparity drives vergence and blur drives accommodation. However, these cues are cross-coupled, so there are conditions under which blur-driven vergence or disparity-driven accommodation occurs.

In several embodiments, accommodation-invariant displays utilize focus-tunable lenses to approximate the blur disk by a point spread function. Focal sweeps can be utilized to create point spread functions by periodically changing the focal length of the lens at a rate faster than the human accommodation system. In various embodiments, an integrated point spread function is calibrated for a depth-invariant near-eye display in a pre-processing step. The point spread function can be utilized to generate a compensation image on the near-eye display by deconvolving color channels of a target image via inverse filtering. In many embodiments, bifocal and/or multifocal lenses similar to bifocal and/or multifocal contact lenses can approximate a point spread function.

Near-Eye Display Systems

Figure 1A:
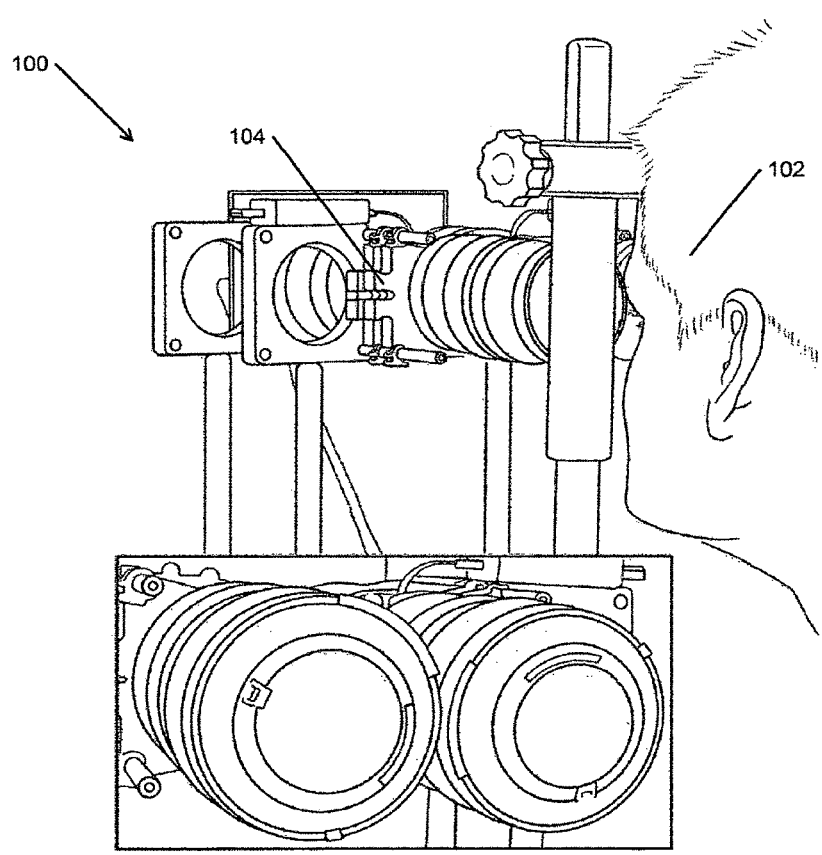
FIGS. 1A and 1B are photographs illustrating near-eye displays in accordance with an embodiment of the invention.
Figure 1B:
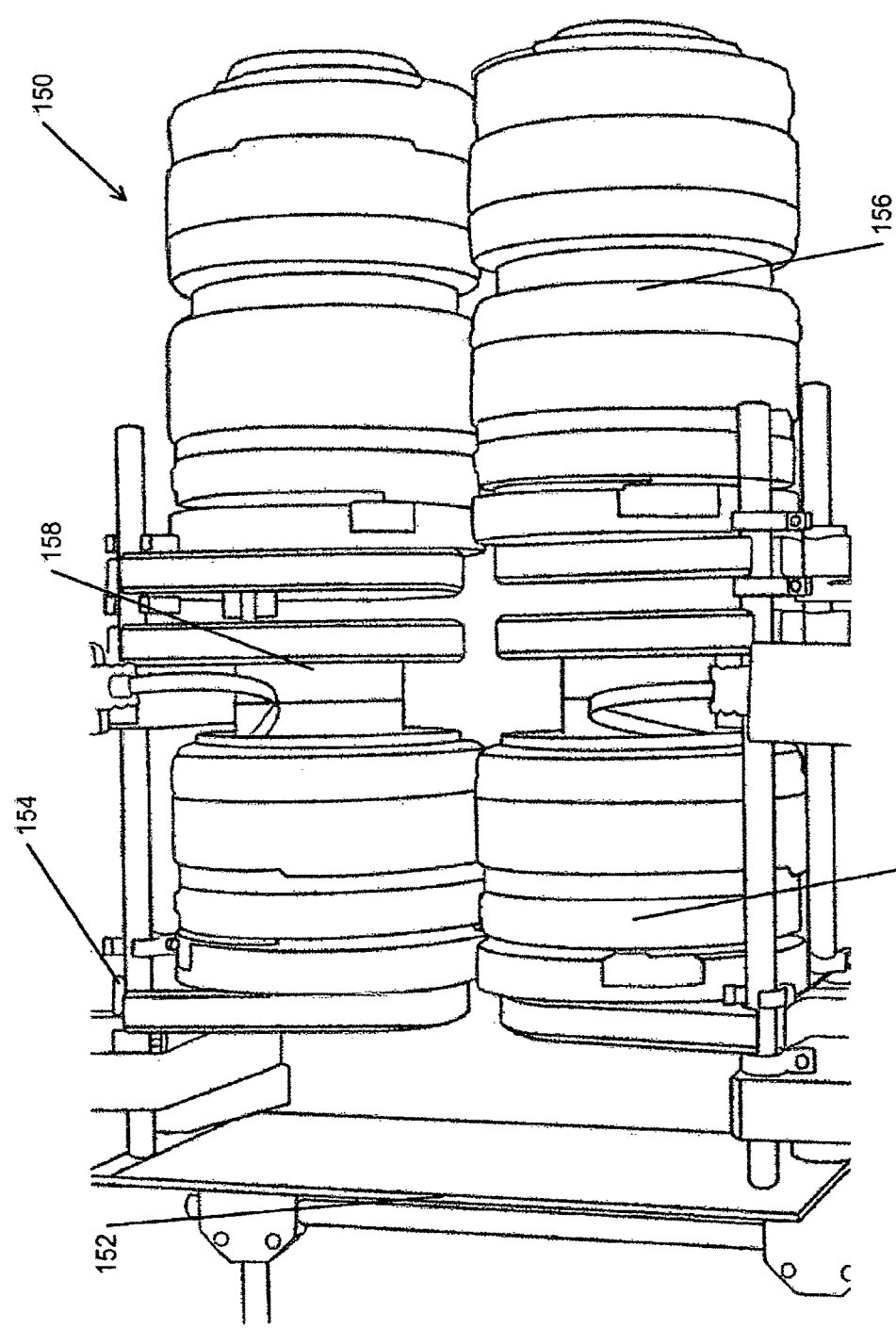

A near eye display system in accordance with an embodiment of the invention is shown in FIGS. 1A and 1B. A user 102 can be seen utilizing near-eye display 104 in image 100 as illustrated in FIG. 1A. Image 150 in FIG. 1B illustrates a near-eye display system in accordance with several embodiments of the invention. The system includes a display 152 connecting to a frame 154. A user (similar to user 102 in FIG. 1A) can see the display by looking through lenses. In many embodiments a user looks at the display through one eye. In various other embodiments, a user looks at the display through both eyes. The lenses can include an optical system for each eye 156. In several embodiments, this optical system for each eye can include three Nikon Nikkor 59 mm f/1.4 camera lenses, but it should be readily apparent to one having ordinary skill in the art this is merely an illustrative example, and many other optical systems can be utilized as suitable for requirements of the invention.

The optical system connects to a focus tunable lens 158. In several embodiments of the invention, the focus tunable lens can be used to create an accommodation invariant point spread function by sweeping this lens. Generating point spread functions by sweeping lenses will be discussed below. In many embodiments of the invention, the focus tunable lens can be an Optotune E1-10-30-C with a 10 mm diameter and a focal range of 5 to 10 diopters, but it should be readily apparent to one having ordinary skill in the art that this is merely an illustrative example and other lenses can be utilized as appropriate. In various embodiments, bifocal and/or multifocal lenses similar to bifocal and/or multifocal contact lenses can be utilized to create an accommodation invariant point spread function. Although a number of different near-eye display systems are discussed above with respect to FIGS. 1A and 1B, any of a variety of display systems can be utilized to display accommodation-invariant images as appropriate to the requirements of specific applications in accordance with various embodiments of the invention. Near-eye display architectures in accordance with several embodiments of the invention will be discussed below.

Near-Eye Display Architectures

Figure 2:
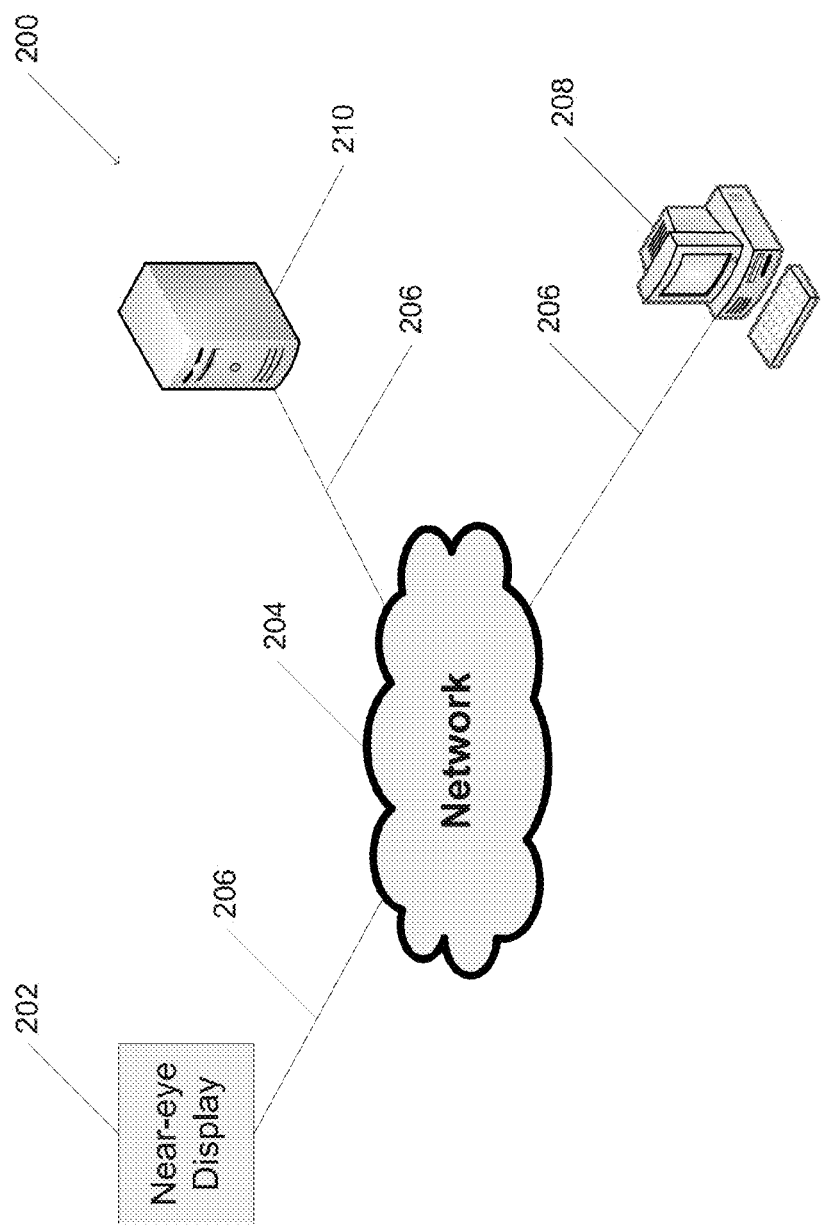
FIG. 2 is a diagram conceptually illustrating a near-eye display connected to a communication network in accordance with an embodiment of the invention.

Near-eye displays connected to a communications network in accordance with an embodiment of the invention is illustrated in FIG. 2. One or more near-eye displays 202 connect to a communication network 204 using a wired and/or wireless connection. In some embodiments, the communication network can be (but is not limited to) internal network, and/or the Internet. The communication network 204 may also be connected to one or more computer systems 208, to a monitor, and/or near-eye displays. Additionally, computer systems 208 may perform preprocessing and/or post-processing steps on data such a (but not limited to) images and/or video displayed on near-eye display 202. In various embodiments, a database management system 210 can be connected to network 204 to store images and/or video for display on the near-eye display. Although various system configurations are described above with reference to FIG. 2, any number of systems can be utilized to achieve control of near-eye displays within a computing environment as appropriate to the requirements of specific applications in accordance with various embodiments of the invention. Near-eye display controllers in accordance with several embodiments of the invention are discussed further below.

Near-Eye Display Controllers

Figure 3:
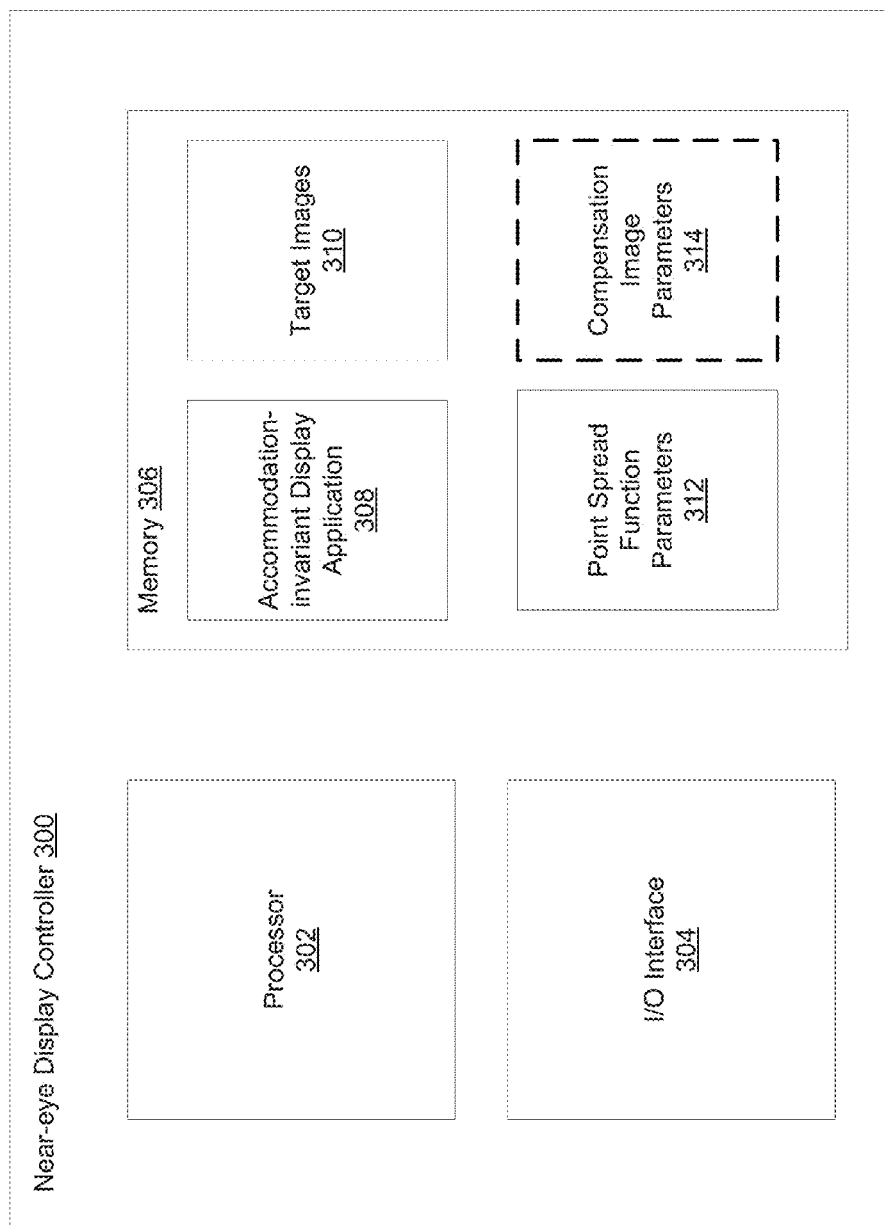
FIG. 3 is a block diagram illustrating a near-eye display controller for accommodation-invariant display control in accordance with an embodiment of the invention.

A near-eye display controller in accordance with an embodiment of the invention is shown in FIG. 3. In many embodiments, near-eye display controller 300 can display accommodation invariant compensation images. The near-eye display controller includes at least one processor 302, an I/O interface 304, and memory 306. The at least one processor 302, when configured by software stored in memory, can perform calculations on and make changes to data passing through the I/O interface as well as to data stored in memory. The memory 306 includes accommodation-invariant display application 308, target images 310, point spread function parameters 312, and compensation image parameters 314. A near-eye display can receive images and/or video from a computing system through the I/O interface. The accommodation-invariant display application 308 can enable the near-eye display to calibrate an impulse response for the near-eye display and calculate and display a target image such that the target image is in focus when displayed on the near-eye display at multiple distances.

Target images are images that are desired to be displayed on a near-eye display before calculations are performed on the images to generate accommodation-invariant images. In many embodiments, target images can be stored directly on a near-eye display. In several other embodiments, target images can be stored on a computing system and/or sever and accessed by the near-eye system through a network similar to the previous communication networks described above with respect to FIG. 2. Point spread function parameters will be discussed in greater detail below, and can calibrate an impulse response for the near-eye display. Compensation image parameters will also be discussed below, and can be utilized to display a representation of the target image on the near-eye display such that the image is in focus at multiple distances. It should be readily apparent that near-eye display controller 300 can be adapted to a variety of near-eye displays including (but not limited to) virtual reality displays and/or augmented reality displays. Although a number of different near-eye display controllers are discussed above with respect to FIG. 3, any of a variety of computing systems can be utilized to control near-eye displays as appropriate to the requirements of specific applications in accordance with various embodiments of the invention. Accommodation driven by disparity will be described below.

Disparity-driven Accommodation

In natural vision, the accommodative distance of the eyes is thought to be largely driven by retinal blur. Specifically, if the eyes modulate their focal distance, the direction of change in focal distance that decreases the retinal blur at fixation can be followed until the accommodative distance that results in the minimum retinal blur is reached. However, the accommodative response of the eyes is also directly coupled to the vergence response, resulting in disparity-driven accommodation that is independent of retinal blur. The properties of disparity-driven accommodation (or "vergence accommodation") have been characterized by removing the natural feedback to the accommodative system: placing pinholes in front of the eyes or otherwise altering the visual stimulus so that retinal blur no longer changes noticeably with accommodation. Under these conditions, it has been shown that the accommodative distance of the eyes will naturally follow the vergence distance. Note, however, that the distance to which the eyes accommodate tends to lag behind the vergence distance—the measured accommodative distance tends to be slightly farther away than the vergence distance.

Figure 5:
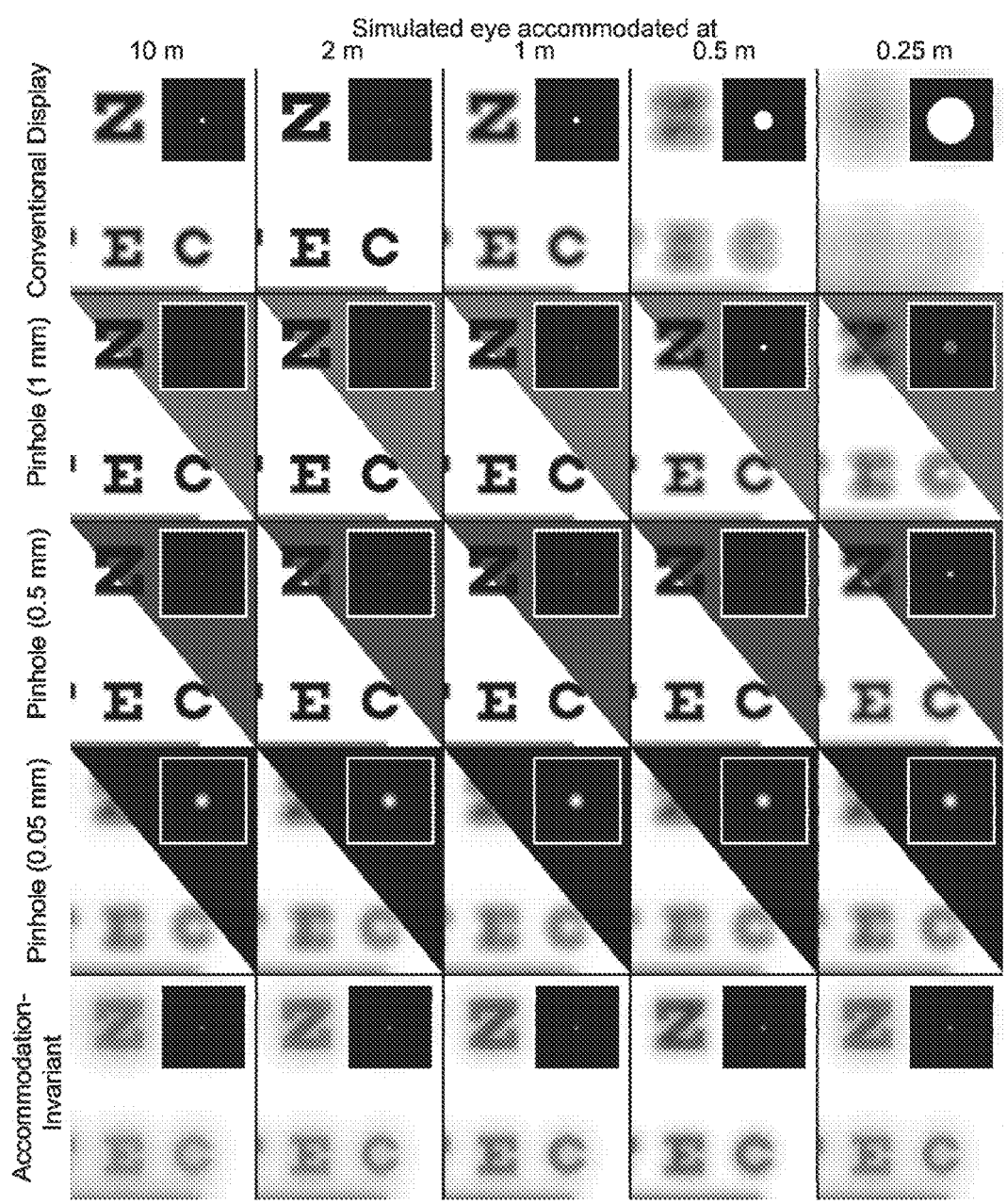
FIG. 5 is a diagram illustrating simulated images generated by an accommodation-invariant pinhole process in accordance with an embodiment of the invention.

In several embodiments of the invention, a near-eye display system that similarly removes the retinal blur gradients used by the accommodative system might allow accommodation to remain coupled to the vergence distance of the eyes, and thus mitigate the discomfort associated with the VAC. Unfortunately, pinholes are not very useful for near-eye display design because they severely reduce light throughput, they can create diffraction-blur of the observed image, and they restrict the eyebox. FIG. 5 illustrates an overview of pinhole processes in accordance with several embodiments of the invention with zemax with 20/20 vision line of a Snellen chart. Conventional displays offer a limited accommodation range (top), pinholes provide extended accommodation ranges by reducing the light and also severely restricting the eyebox. When the pinhole is too small (row 4), image resolution is degraded by diffraction. The accommodation-invariant case provides light efficiency and wide accommodation ranges with slight image blur but a resolution exceeding 20/20 vision. Point spread functions are magnified by 0.75 times. The limited eyebox can be overcome by either using a contact lens with a pinhole or using an array of pinholes.

Extended Depth of Field

The idea of computational techniques to extend depth of field comes from the imaging community in an attempt to tackle the fundamental tradeoff between depth of field and noise. As an alternative to pinhole cameras, extended depth of field (EDOF) was developed to improve light throughput.

Although their design used cubic phase plates to engineer a depth-invariant point spread function, other optical implementations including focal sweeps via sensor or object motion or focus-tunable optics, diffusers, chromatic aberrations in camera lenses, and axicons have been described to achieve similar effects.

EDOF displays have also been proposed to extend the focal range of projectors. EDOF cameras differ from EDOF displays in that processing is done after image capture, which allows for larger degrees of freedom and natural image priors to be used for image recovery. The primary limitation of an EDOF display is usually its dynamic range: image contrast may be degraded for pre-processed, projected imagery.

In contrast to existing volumetric and light field displays, accommodation-invariant near-eye displays in accordance with several embodiments of the invention may provide a practical technology that can be implemented with readily-available components while offering acceptable image resolution, a wide field of view, a large eyebox, and visually comfortable immersive experiences.

Near-Eye Displays with Focus-Tunable Lenses

Figure 6:
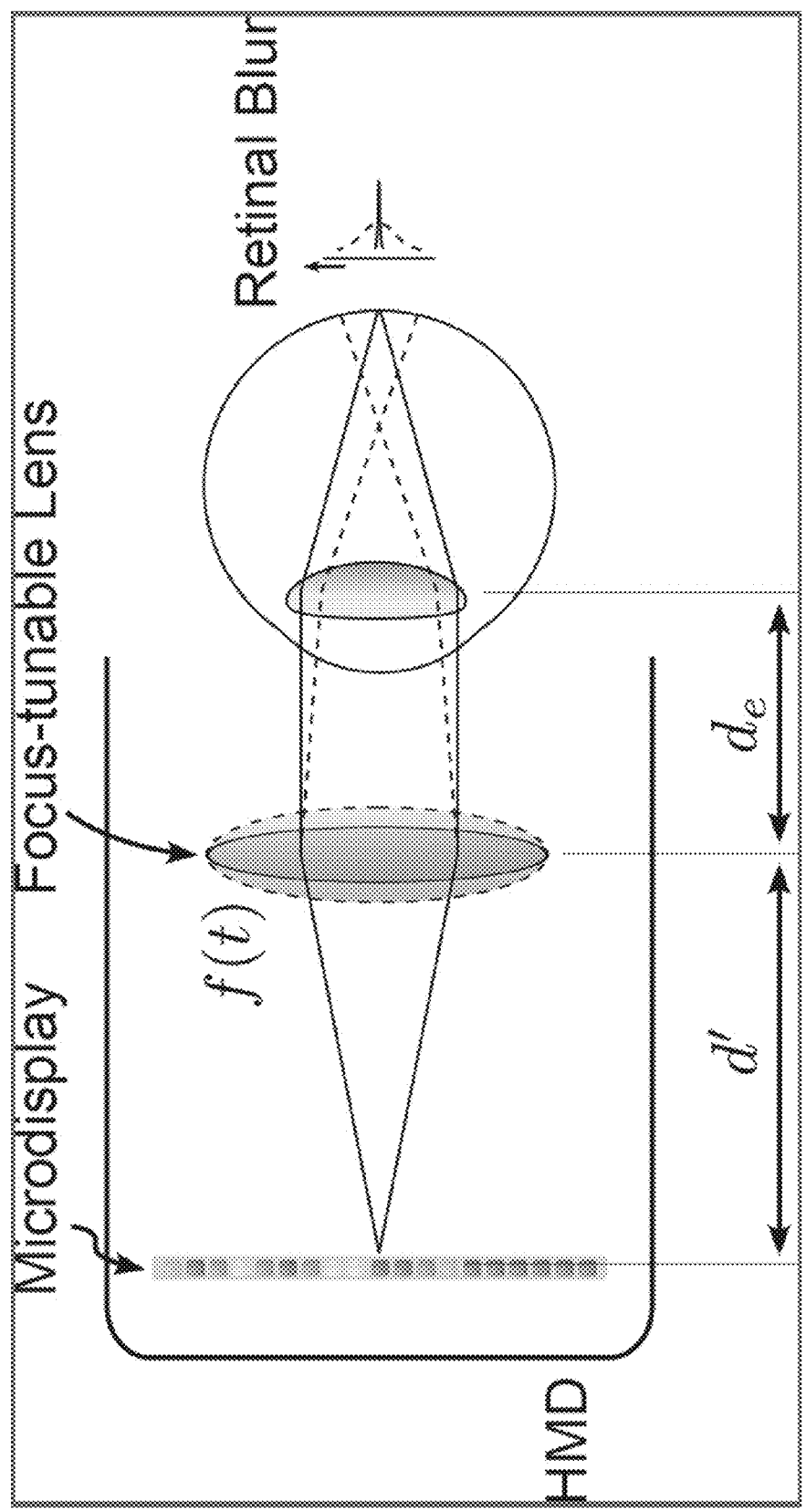
FIG. 6 is a diagram illustrating the relationship between a focus-tunable lens and a microdisplay in accordance with an embodiment of the invention.

The optical design of most near-eye displays is surprisingly simple. As illustrated in FIG. 6, a microdisplay is located behind a magnifying lens. FIG. 6 further illustrates how head mounted displays (HMDs) place a microdisplay behind a magnifying lens. Using focus-tunable optics, the focal length of the lens can be controlled at a speed that is faster than that of the human accommodation system. This allows for the perceived retinal blur to be controlled, for example to make it accommodation-invariant. The distance between lens and physical display d' is usually slightly smaller than the focal length of the lens f, such that a magnified virtual image is optically created at some larger distance d (not shown in figure). Both the magnification M and d can be derived from the Gaussian thin lens formula as $$\frac{1}{d'} + \frac{1}{d} = \frac{1}{f} \Rightarrow d = \frac{1}{\frac{1}{f} - \frac{1}{d'}}, \; M = \frac{d}{d'} = \frac{f}{d' - f} \qquad (1)$$

This basic image formation model is applicable to most near-eye displays. When focus-tunable lenses are employed, the focal length of the lens f is programmable, so the distance to the virtual image can be written as a function of the focal length d(f).

When an observer views a near-eye display and accommodates at some distance $d_a$, the diameter of the perceived retinal blur is $$b(f) = \frac{fe}{\underbrace{\frac{d_a - f_e}{M_e}}} \cdot \xi \cdot \frac{|d_e + d(f) - d_a|}{d_e + d(f)}, \qquad (2)$$

where $\xi$ is the pupil diameter, $f_e$ is the focal length of the eye, $d_a$ is the distance at which the eye is accommodated, $M_e$ is the magnification of the eye, and $d_e$ is the eye relief (see FIG. 6).

The blur gradient with respect to depth can drive the accommodation state of a viewer with normal vision towards d(f). Note that any software-only approach to changing the rendered image in the display (e.g., gaze-contingent retinal blur) may be able to affect the blur in a perceived image, but not the retinal blur gradient $\partial b/\partial d_a$, which is actually driving accommodation. Only a change in either f or d' affects the blur gradient, which is achieved using focus-tunable optics (varying f) or actuated displays (varying d').

Although Equation 2 is a convenient mathematical tool to predict the blur diameter of a focus-tunable near-eye display, in practice one rarely observes a perfectly disk-shaped blur. Optical aberrations, diffraction, and other effects degrade the intensity distribution within the blur circle. This can be modeled by approximating the blur disk by a Gaussian point spread function (PSF)

$$\rho(r, f) = \frac{2}{\pi(c \cdot b(f))^2} e^{-\frac{2r^2}{(c \cdot b(f))^2}} \qquad (3)$$

where $r = \sqrt{x^2 + y^2}$ is the lateral distance from the blur center and c is a constant.

Accommodation-Invariant Display Processes

Figure 7:
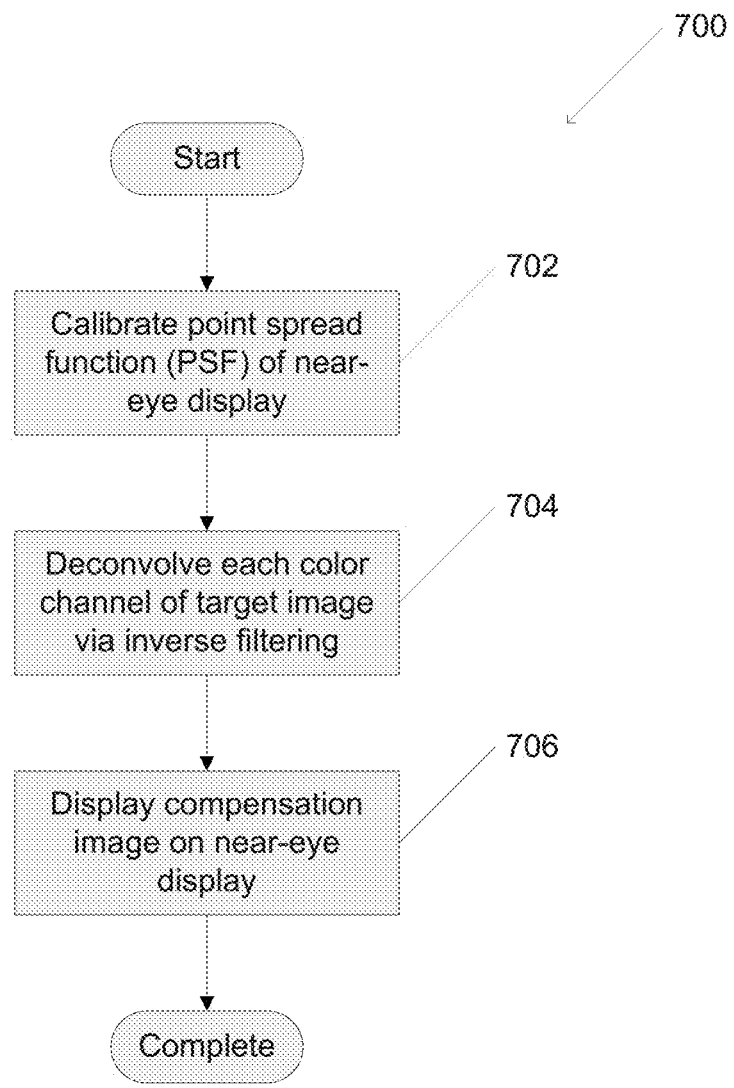
FIG. 7 is a flow chart illustrating a process to generate a compensation image for display on a near-eye display in accordance with an embodiment of the invention.

A process for an accommodation-invariant image to be displayed on a near-eye display is illustrated in FIG. 7. Process 700 includes calibrating (702) a point spread function of a near eye display. In many embodiments, this calibration step can be a preprocessing step. In several other embodiments, the PSF is an integrated point spread function. Each color channel of a target image is deconvolved (704) via inverse filtering. In many embodiments, each color channel is individually deconvolved. Deconvolution via inverse filtering is described further below. This creates a compensation image, a representation of a target image in a screen of a near-eye display that is in focus at multiple distances. It should be readily apparent to one having ordinary skill in the art that deconvolution via inverse filtering is merely an illustrative example and other deconvolution methods can be used as appropriate such as (but not limited to) the trust region reflective constrained optimization method implemented in the Matlab lsqlin function. The compensation image is displayed (706) on the near-eye display. In various embodiments, the near-eye display is a virtual reality display. In several other embodiments, the near-eye display is an augmented reality display. Although a number of accommodation-invariant display processes are discussed above with respect to FIG. 7, any of a variety of different processes for generating an image for a near-eye display that is in focus at multiple distances can be utilized as appropriate to the requirements of specific applications in accordance with various embodiments of the invention. Focal sweeps will be discussed below.

Depth-Invariance Via Focal Sweep

In several embodiments of the invention, depth-invariant PSFs are created utilizing focal sweeps. These sweeps are easily created with focus-tunable lenses by periodically changing the focal length f of the lens. For near-eye displays, one sweep period would have to be an integer multiple of the display refresh rate (usually 60 Hz). To prevent possible artifacts, the sweeping time should also be faster than the speed of the human accommodation system. Since the latter is in the order of hundreds of milliseconds, this can be achieved utilizing tunable lenses.

In many embodiments of the invention, a focus sweep creates a temporally-varying PSF that the observer perceptually integrates due to the finite "exposure time" T of the visual system. The perceived, integrated PSF $\tilde{\rho}$ is then given as $$\tilde{\rho}(r) = \int_0^T \rho(r, f(t)) dt, \qquad (4)$$

where f(t) maps time to temporally-varying focal length. Oftentimes, $$\frac{1}{f(t)},$$

the focal length in dioptric space, is a periodic triangle-like function, ensuring that the blur diameter varies linearly in time.

In practice, the integrated PSF of a depth-invariant near-eye display is calibrated in a preprocessing step and then used to deconvolve each color channel of a target image i individually via inverse filtering as $$i_c(x, y) = \mathcal{F}^{-1}\left\{\frac{\mathcal{F}\{i(x, y)\}}{\mathcal{F}\{\tilde{p}(x, y)\}}\right\}. \tag{5}$$

Here, $i_c$ is the compensation image that needs to be displayed on the screen such that the user perceives the target image i and $\mathcal{F}\{\bullet\}$ is the discrete Fourier transform. Note that depth-invariant displays are different from depth-invariant cameras in that one does not have to deal with noise during deconvolution, a challenge for all deconvolution algorithms. Therefore, a simple deconvolution technique such as inverse filtering achieves near-optimal results. However, the display has a limited dynamic range, which should theoretically be taken into consideration for the deconvolution problem by integrating the blacklevel and maximum brightness as hard constraints. It will be shown below that the difference between inverse filtering and constrained optimization-based deconvolution for the PSFs measured with many embodiments of the invention are negligible.

Bounds on Image Resolution

The variance of the Gaussian PSF in Equation 3 is $$\sigma^2 = \left(\frac{c}{2}b(f)\right)^2.$$

Due to the fact that the sum of Gaussian functions is also a Gaussian, the variance of the integrated PSF (Eq. 4) is $$\tilde{\sigma}^2 = \frac{c^2}{4}\int_0^T b(f(t))^2 dt. \tag{6}$$

The closed-form solution of this integral depends on the specific range of the focal sweep and the sweep function f(t). It is obvious, however, that the integrated PSF has a larger variance than the smallest PSF of a conventional near-eye display. Hence, accommodation-invariant displays impose a fundamental tradeoff between accommodation-invariant range and image resolution. This tradeoff can also be observed in photographed results (e.g., FIGS. 8A, 8B, and 9). A detailed analysis of this tradeoff is desirable, and it should consider the diffraction-limited resolution of conventional near-eye displays as well as the full eye box, which introduces slightly view-dependent effects in the PSFs.

Figure 8A:
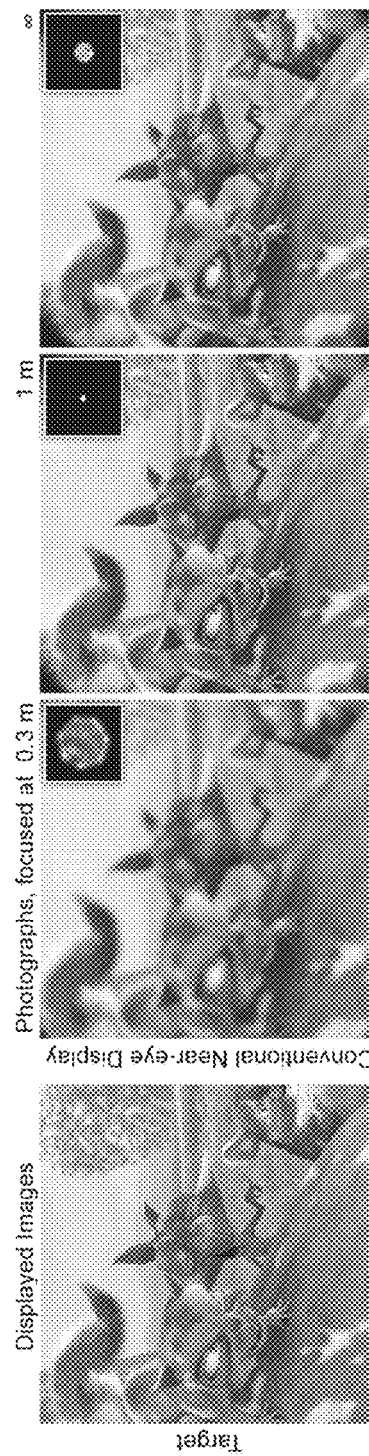
FIG. 8A shows images illustrating how a target image appears on a traditional display.
Figure 8B:
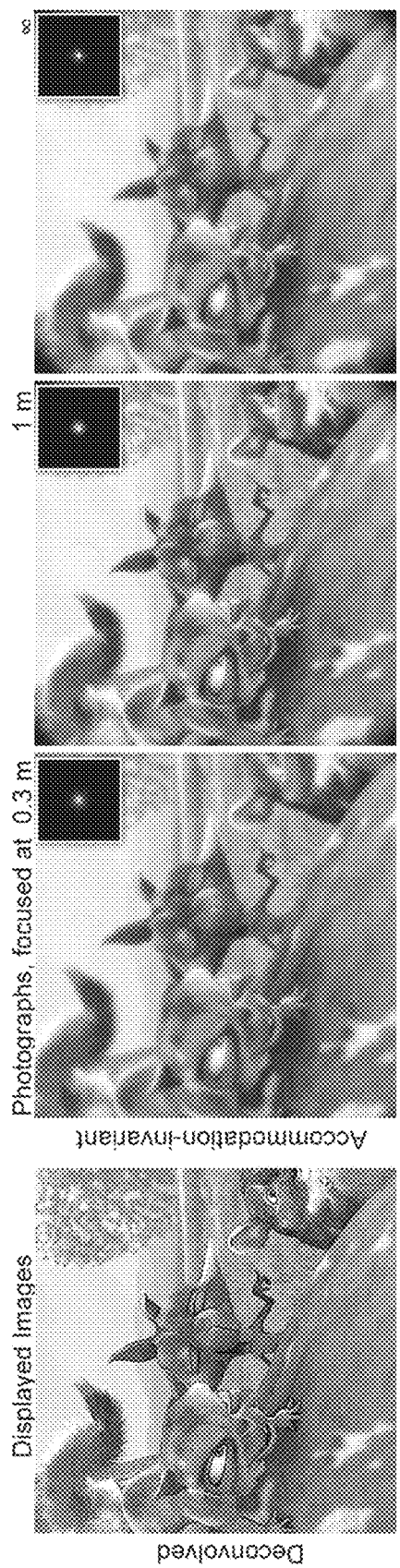
FIG. 8B shows images illustrating how a target image appears on an accommodation-invariant display in accordance with an embodiment of the invention.

FIG. 8A illustrates how the image appears in a conventional display. FIG. 8B illustrates how the image appears in an accommodation-invariant display. In each image, the inset indicates the magnified PSF for one accommodative distance. In a conventional display, the target image is viewed directly, and is only in focus at a single accommodative distance (here at 1 m). If the eye accommodates nearer or farther, the PSF increases and the image is out of focus. In an accommodation-invariant display, the deconvolved image results in a PSF that is the same regardless of how the eyes are focused, thus the image appears similarly clear at all accommodative distances.

Figure 9:
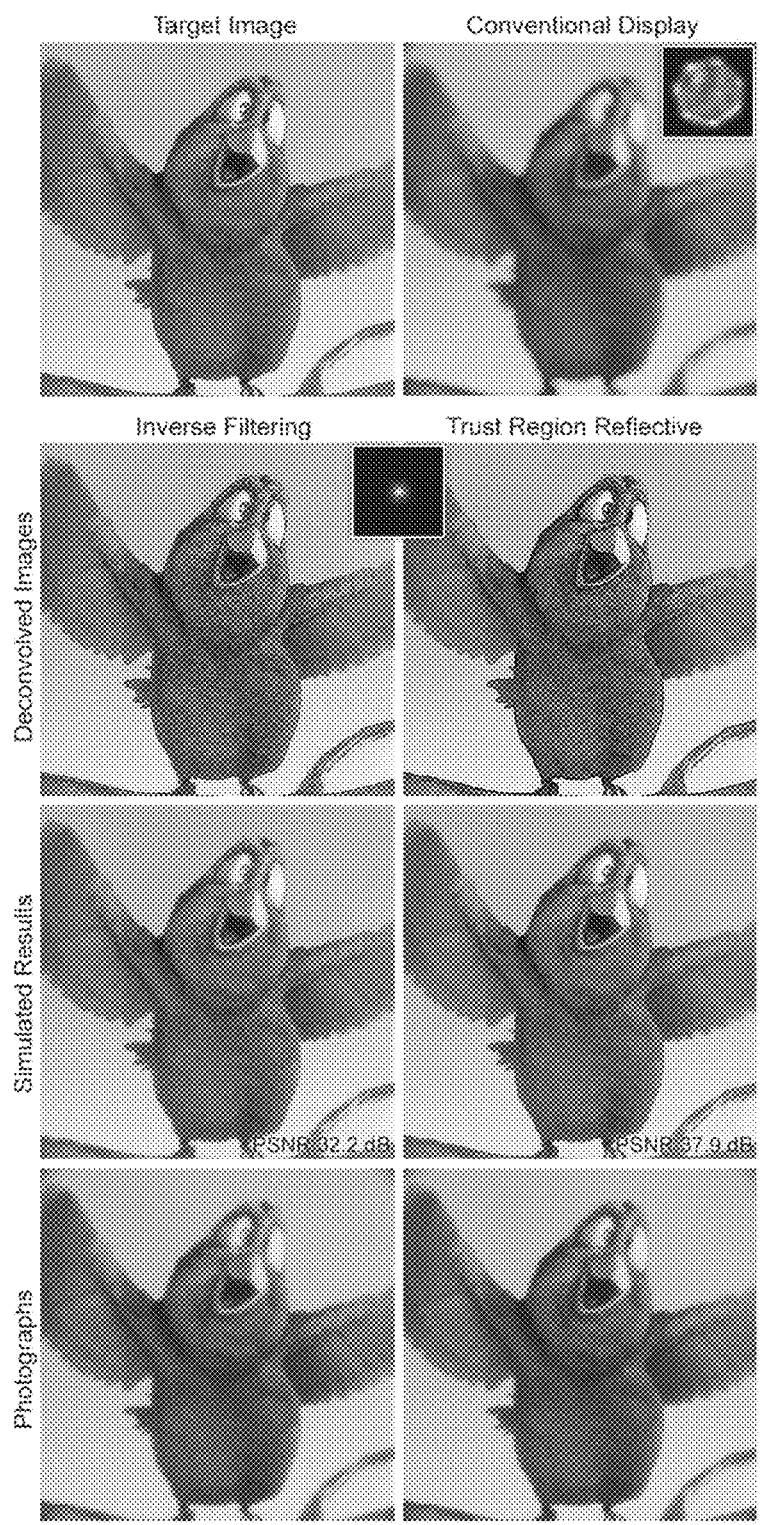
FIG. 9 shows images illustrating a comparison of deconvolution methods in accordance with an embodiment of the invention.

FIG. 9 illustrates a comparison of deconvolution methods. A target image (top left), creates a sharply-focused image only at a single plane (here at 1 m, not shown here) but the perceived blur when accommodated at other distances is severe (top right, focused at 25 cm). Accommodation-invariant displays provide a depth-invariant PSF (center inset, focused at 25 cm) but require the target image to be deconvolved prior to display. Two deconvolution methods are compared: inverse filtering and constrained optimization (row 2). The latter provides a baseline for the best possible results, whereas inverse filtering creates near-optimal results in real-time. Photographs of the prototype (row 4) match simulations (row 3).

Hardware

A photograph of an embodiment of the present invention is illustrated in FIG. 1B. Many embodiments of the invention can use a liquid crystal display (LCD) such as a Topfoison TF60010A LCD with a resolution of 2560×1440 pixels and a screen diagonal of 5.98". In several embodiments, the backlight of the LCD can be strobed to enhance image quality. It should be readily apparent to one having ordinary skill in the art that LCDs are illustrative and many other displays can be utilized as appropriate to embodiments of the invention such as (but not limited to) light emitting diodes and/or organic light emitting diodes. In various embodiments of the invention, the optical system for each eye can comprises three Nikon Nikkor 50 mm f/1.4 camera lenses. These lenses provide high image quality with few aberrations. The lens closest to the screen can be mounted at a distance of 50 mm to create a virtual image at optical infinity. The focus-tunable lens is an Optotune EL-10-30-C with 10 mm diameter and a focal range of 5 to 10 diopters (D). It is abutting this lens, and is offset with a −10 D lens giving it an effective range of −5 D to 0 D. Without current applied, the focus-tunable lens places the virtual image at −5 D (0.2 m), but with increasing current the curvature of the liquid lens is increased, thereby placing the virtual image at a farther distance from the observer. To create the accommodation-invariant PSF the lens' focal power is swept in a triangle wave at 60 Hz over the full range, −5 D to 0 D. Conceptually, the eyeball of the observer would have to be placed right on the focus-tunable lens, which is mechanically difficult and would also not be comfortable. Hence, the other two camera lenses provide a 1:1 optical relay system that increases the eye relief to about 1-2 cm. In various other embodiments, a mechanical lens can be used. In further embodiments, a bifocal or multifocal lens similar to a bifocal or multifocal contact lens can be utilized in place of (or in addition to) a lens system in hardware. Bifocal and/or multifocal lenses generally contain areas of different focus. These different areas of the bifocal and/or multifocal lens can be utilized to create the accommodation-invariant PSF by placing the image at different focal distances from the lens.

In several embodiments of the invention, the eyebox provided by this display is 10 mm in diameter, but the integrated PSFs generated for the accommodation-invariant display mode are view-dependent. The useable eyebox is therefore restricted to about 5 mm. For user evaluations, head motions of the subjects are restricted with a head rest. The resolution provided to each eye is 620×620 pixels and the monocular field of view is approximately 36° both horizontally and vertically. The mechanical spacing between the lenses places their optical centers at a distance of 6.47 cm. In the current prototype, users with an interpupillary distance that is smaller than this may not be able to fuse the rendered stereo image pairs, but alternative implementations could address this. It should be readily apparent to one having ordinary skill in the art that hardware implementation described above are merely illustrative and various other implementations can be utilized as appropriate according to various embodiments of the invention.

Calibration

Figure 10:
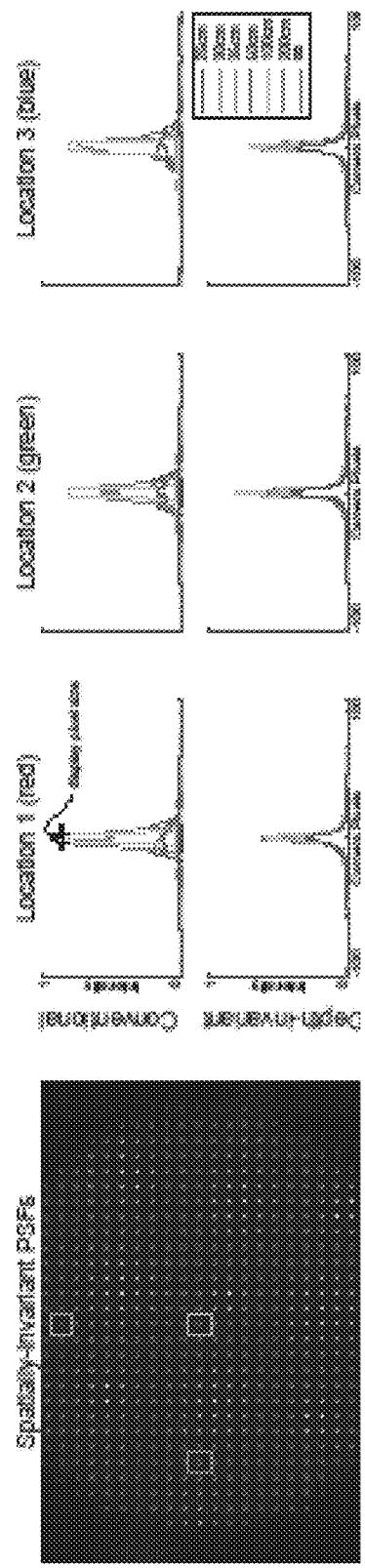
FIG. 10 shows plots illustrating individual color channels of point spread functions in accordance with an embodiment of the invention.
Figure 11:
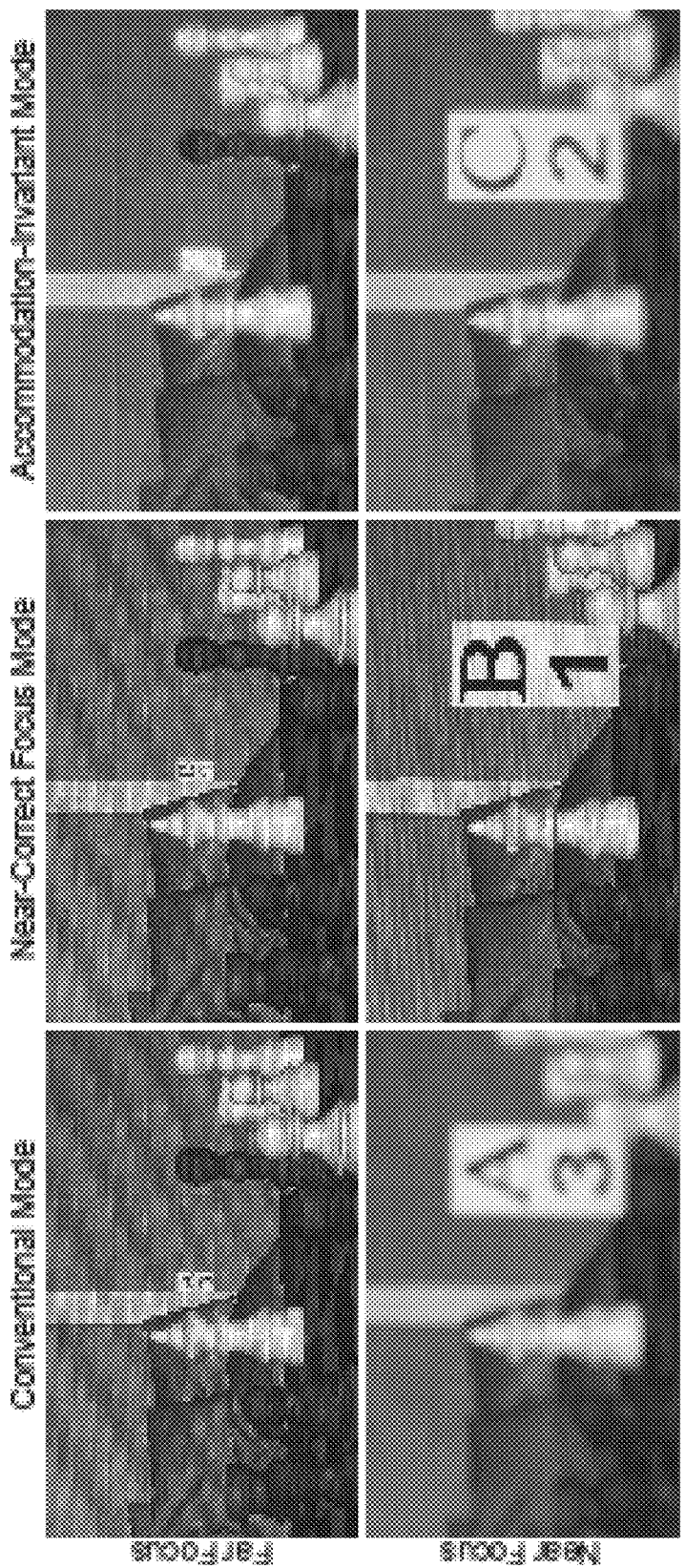
FIG. 11 shows screenshots utilized in user evaluations of an accommodation-invariant mode compared to a conventional mode and a near-correct focus mode.

To confirm lateral and depth-invariance of the point spread functions created by an embodiment of the present invention, a plot of measured data is shown in FIG. 10, which illustrates captured point spread functions of the green display channel. For the proposed display, the PSFs are spatially-invariant (left) and nearly depth-invariant (bottom plots). The plots show 1 D slices of captured PSFs at several different locations for conventional (top) and depth-invariant (bottom) near-eye displays. Whereas the conventional PSFs quickly blur out away from the focal plane at 1 m, the shape of the depth-invariant PSFs remains almost constant throughout the entire accommodation range.

This data is captured with a Canon Rebel T5 SLR camera and a Nikon Nikkor 35 mm prime lens with an aperture diameter of 3.18 mm. The lateral PSFs is shown for one focus setting of the depth-invariant display in FIG. 10 (left). As predicted, the PSFs created by many embodiments of the present invention are nearly invariant to lateral location on the display as well as accommodation distance. The PSFs of the conventional display quickly blur out. Their non-uniform shape is due to a combination of non-uniform display pixel shape, non-circular shape of the camera aperture, and imperfections of the optical system. Remaining amplitude differences in the depth-invariant PSFs are due to minute imperfections in the waveforms driving the focus-tunable lenses. Note that the plots are shown in camera pixel coordinates—the display pixel size is indicated and provides the highest possible resolution in all cases. All plots are scaled to the same, relative intensity.

Software

Software for various embodiments of the present invention can be implemented in C++. The OpenGL application programming interface can be used for 3D rendering and image deconvolution can be implemented via inverse filtering in CUDA. OpenGL is a application programming interface for rendering two and three dimensional vector graphics managed by the Khronos Group consortium. CUDA is a parallel computing platform and application programming interface developed by Nvidia. For each eye, the deconvolution takes about 5 ms. The total latency for stereo rendering and deconvolution is below 15 ms for the simple scenes used in simulations in accordance with an embodiment of the present invention and user evaluation. In many embodiments of the invention, dedicated chips including (but not limited to) field programmable gate arrays (FPGAs) and/or application-specific integrated circuits (ASICs) can utilized. In several embodiments of the invention, these chips can be dedicated to the processing of software applications, and can to accelerate software runtimes and/or optimize power consumption. It should be readily apparent to one having ordinary skill in the art that software implementations described above are merely illustrative and various other software implementations can be utilized as appropriate to requirements of many embodiments of the invention.

Results

FIGS. 8A, 8B, and 9 show several results photographed from an embodiment of the present invention. FIGS. 8A and 8B compare the observed optical blur and corresponding point spread functions (insets) for three different accommodation distances: 0.3 m, 1 m, and optical infinity. The images are captured with an aperture diameter of 3.18 mm, which is comparable to the average human pupil diameter under the given illumination conditions. The blur of a conventional display quickly increases away from the focal plane at 1 m. Accommodation-invariant displays provide a nearly depth-invariant PSF. A target image is deconvolved with that PSF, the resulting compensation image is displayed on the screen, and the observed image, here photographed from the prototype, provides a close approximation to the target image with a constant blur gradient.

Additionally, two different deconvolution methods are compared in FIG. 9. Inverse filtering (Eq. 5) is the most straightforward approach to deconvolution, but it does not account for constraints imposed by the dynamic range of the physical display. Hence, the results provided by inverse filtering are compared with those generated by the trust region reflective constrained optimization method implemented in the Matlab lsqlin function. Although the peak signal-to-noise ratio (PSNR) of the constrained optimization approach is about 5 dB better, the qualitative difference on an embodiment of the present invention (FIG. 9, bottom) is marginal. Faint halos around high-contrast edges are sometimes observed, as seen in the bird's eye and beak. For the user studies, inverse filtering was selected because it can be easily implemented on the GPU and provides real-time framerates.

Evaluations of accommodation-invariant displays including user evaluations in accordance with many embodiments of the invention are described in "Accommodation-invariant Computational Near-eye Displays" by Gordon Wetzstein et al., the disclosure of which is hereby incorporated by reference herein in its entirety. Additional details for display calibration, simulations of different optical implementations, and extended results for scenes illustrated in FIGS. 8A, 8B, and 9 are described in "Supplementary Material: Accommodation-Invariant Computational Near-eye Displays" by Gordon Wetzstein et al., the disclosure of which is hereby incorporated by reference herein in its entirety.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects and illustrative and not restrictive. Accordingly, the scope of the invention should be determined not by the embodiments illustrated, by the appended claims and their equivalents.

What is claimed is:
1. A display system comprising:
a near-eye display;
a processor;
a memory containing a target image and an accommodation-invariant display application;

where the processor is configured by the accommodation-invariant display application to:
calculate an impulse response of the near-eye display;
calculate a compensation image by generating a deconvolved color channel of the target image using a ratio of the target image and the impulse response and inverse filtering, wherein:
the compensation image is a representation of the target image that remains in focus at a plurality of distances from the near-eye display; and
the inverse filtering is evaluated by the processor by using the following expression:

$$i_c(x, y) = \mathcal{F}^{-1}\left\{\frac{\mathcal{F}\{i(x, y)\}}{\mathcal{F}\{\tilde{\rho}(x, y)\}}\right\}$$

where $i_c$ is the compensation image, i is the target image, $\tilde{\rho}(x, y)$ is the integrated point spread function, and $\mathfrak{I}\{\bullet\}$ is the discrete Fourier transform; and
display the compensation image on the near-eye display.

2. The display system of claim 1, wherein the impulse response is an integrated point spread function.

3. The display system of claim 2, wherein the integrated point spread function is evaluated by the processor by using the following expression:

$$\tilde{\rho}(r) = \int_o^T \rho(r, f(t)) dt$$

where $\tilde{\rho}(r)$ is the integrated point spread function, $\rho(r, f(t))$ is a Gaussian point spread function, T is a finite exposure time, and f(t) maps time to temporally-varying focal lengths.

4. The display system of claim 3, wherein the integrated point spread function further comprises a variance which is evaluated by the processor using the following expression:

$$\tilde{\sigma}^2 = \frac{c^2}{4}\int_0^T b(f(t))^2 dt$$

where $\tilde{\sigma}$ is the variance, T is a finite exposure time, f(t) maps time to temporally-varying focal lengths, c is a constant, and b is a constant.

5. The display system of claim 1, wherein generating the deconvolved color channel of the target image further comprises generating each color channel of the target image individually.

6. The display system of claim 1, wherein the near-eye display is a head mounted display.

7. The display system of claim 1, wherein the near-eye display is a virtual reality display.

8. The display system of claim 1, wherein the near-eye display is an augmented reality display.

9. A method for displaying an image comprising:
calculating an impulse response of a near-eye display using a processor configured by an accommodation-invariant display application stored in a memory;
calculating a compensation image by generating a deconvolved color channel of a target image based on a ratio of the target image and the impulse response using inverse filtering using the processor, wherein:
the compensation image is a representation of the target image that remains in focus at a plurality of distances from the near-eye display; and
the inverse filtering is evaluated by the processor by using the following expression:

$$i_c(x, y) = \mathcal{F}^{-1}\left\{\frac{\mathcal{F}\{i(x, y)\}}{\mathcal{F}\{\tilde{\rho}(x, y)\}}\right\}$$

where $i_c$ the compensation image, i is the target image, $\tilde{\rho}(x,y)$ is the integrated point spread function and $\mathfrak{I}\{\bullet\}$ is the discrete Fourier transform; and
displaying the compensation image on the near-eye display.

10. The method of claim 9, wherein the impulse response is an integrated point spread function.

11. The method of claim 10, wherein the integrated point spread function is evaluated by the processor by using the following expression:

$$\tilde{\rho}(r) = \int_o^T \rho(r, f(t)) dt$$

where $\tilde{\rho}(r)$ is the integrated point spread function, $\rho(r, f(t))$ is a Gaussian point spread function, T is a finite exposure time, and f(t) maps time to temporally-varying focal lengths.

12. The method of claim 11, wherein the integrated point spread function further comprises a variance which is evaluated by the processor using the following expression:

$$\tilde{\sigma}^2 = \frac{c^2}{4}\int_0^T b(f(t))^2 dt$$

where $\tilde{\sigma}$ is the variance, T is a finite exposure time, f(t) maps time to temporally-varying focal lengths, c is a constant, and b is a constant.

13. The method of claim 9, wherein generating the deconvolved color channel of the target image further comprises generating each color of the target image individually.

14. The method of claim 9, wherein the near-eye display is a head mounted display.

15. The method of claim 9, wherein the near-eye display is a virtual reality display.

16. The method of claim 9, wherein the near-eye display is an augmented reality display.

* * * * *